May 26, 1925.
A. W. HOOKOM
CRANK HOLDER
Filed May 10, 1924
1,539,190
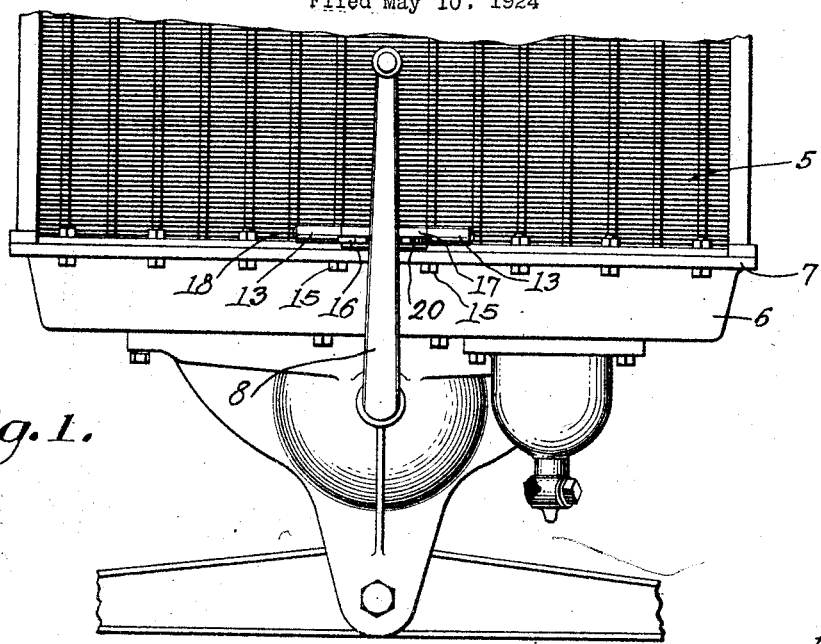
Fig. 1.
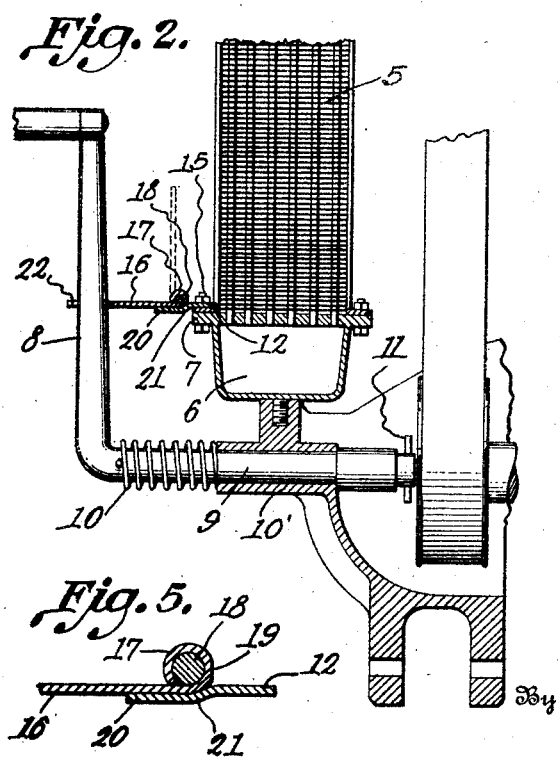
Fig. 2.
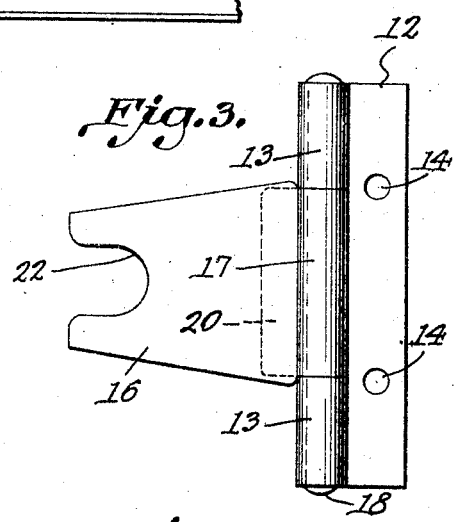
Fig. 3.
Fig. 4.
Fig. 5.
Inventor
A. W. Hookom
Jerry A Mathews
Attorney Patented May 26, 1925.

1,539,190

UNITED STATES PATENT OFFICE.

AMEL W. HOOKOM, OF IOWA CITY, IOWA.

CRANK HOLDER.

Application filed May 10, 1924. Serial No. 712,328.

*To all whom it may concern:*

Be it known that I, AMEL W. HOOKOM, a citizen of the United States, residing at Iowa City, in the county of Johnson and State of Iowa, have invented certain new and useful Improvements in Crank Holders, of which the following is a specification.

My invention relates to a crank holding device, for use in connection with internal combustion engines of tractors, automobiles or the like, for holding the crank in the forward and elevated position.

As is well known, the crank of a tractor, such as a Fordson tractor, when allowed to hang down, frequently catches in weeds or other obstruction, while the tractor is being driven, with the result that the crank is moved inwardly and its clutch thrown into action. The operation of the engine frequently destroys the clutch or does other damage.

In accordance with my invention I have provided an extremely simple device, which will securely hold the crank of a tractor or the like, in the forward position, preferably when elevated, whereby it will not be engaged by weeds or the like, and cannot be shifted rearwardly.

A further object of the invention is to provide a device of the above mentioned character, having means for retaining the holding element in the raised position, whereby it will not interfere with the proper cranking of the engine.

Other objects and advantages of the invention will be apparent during the course of the following description.

In the accompanying drawings forming a part of this specification, and in which like numerals are employed to designate like parts throughout the same, Figure 1 is a front elevation of a tractor, parts omitted, showing my lock device applied thereto, Figure 2 is a central vertical longitudinal section through the lock device, and associated elements, parts in elevation, Figure 3 is a plan view of the lock device, Figure 4 is a side elevation of the same, and, Figure 5 is an enlarged detail section through the knuckle of the holding element.

In the drawings, wherein for the purpose of illustration is shown a preferred embodiment of my invention, the numeral 5 designates the radiator of a tractor, such as a Fordson tractor, embodying the usual lower shell or casing 6, having a forward horizontal flange 7. The numeral 8 designates the usual crank of the tractor, carried by the shaft 9, urged forwardly by a spring 10. The shaft 9 is journaled in a bearing 10' and carries the clutch element 11, for coaction with the corresponding clutch element on the crank shaft of the engine. It is thought that no further description of the tractor need be given.

My lock device embodies a stationary element or leaf 12, having knuckles 13, bent upwardly thereon. The leaf 12 is apertured at 14, for the reception of bolts 15, which serve to clamp the leaf 12 to the flange 7.

The numeral 16 designates a vertical holding element or leaf, provided at its rear end with an upwardly bent knuckle 17, arranged between the knuckles 13. The knuckles 13 and 17 receive a pin or pintle 18, which serves to pivotally connect the two leaves or parts 12 and 16. The knuckle 17 is generally circular in cross section and is provided upon its outer rear face with a flattened portion 19, for contact with a resilient tongue 20, preferably formed integral with the leaf or element 12, between the knuckles 13. The tongue 20 extends downwardly below the lower face of the leaf 12, and is preferably generally horizontal, while its rear portion 21 is curved. The tongue serves to limit the movement of the holding element or leaf 16, beyond the horizontal position, and is also adapted to contact with the flat face 19 of the knuckle 17, thereby serving to hold the lock or holding element 16 in the raised or vertical position. The holding element 16 is provided at its forward end with a recess 22, adapted for the reception of the crank 8, when the crank is in the raised position.

In the use of the device, when the crank 8 is in the elevated position, Figure 2, and shifted forwardly, so that the clutch element 11 is out of engagement with the coacting clutch element, the holding element 16 may be moved to the horizontal position, so that the recess 22 receives the crank 8. The holding element or leaf 16 being now horizontally arranged, it positively prevents the inward movement of the crank 8, and also of course holds it against turning movement. When it is desired to crank the engine, the holding element or leaf 16 may be shifted to the vertical position, and this will bring the flat face 19 in contact with the tongue 20, which is somewhat resilient. These coacting parts will now lock the element or leaf 16 in the raised position, so that it will not interfere with the turning of the crank 8.

While I contemplate applying my device to a tractor of the type shown, it is obvious that the invention is not restricted to this particular use, as it may be applied to other types of tractors and to other automobiles.

It is to be understood that the form of my invention herewith shown and described is to be taken as a preferred example of the same, and that various changes in the shape, size, and arrangement of parts may be resorted to, without departing from the spirit of the invention, or the scope of the subjoined claims.

Having thus described my invention, I claim:

1. A device for holding a crank of an automobile against turning movement, comprising a substantially horizontal part adapted to be mounted upon the forward end of the automobile and having a knuckle, a substantially horizontal resilient tongue carried by the horizontal part and projecting forwardly beyond the knuckle, a swinging part for engagement with the crank and having a knuckle, means pivotally connecting said knuckles so that the knuckle of the swinging part is in permanent frictional engagement with the resilient tongue, said resilient tongue supporting the swinging part when in the horizontal position, and securely holding the same in the vertical inactive position when shifted thereto.

2. A device for holding the crank of an automobile against turning movement, comprising a substantially horizontal part having a knuckle and adapted to be attached to the forward end of an automobile, a substantially horizontal resilient tongue formed integral with the substantially horizontal part and projecting forwardly therebeyond, a swinging crank engaging part having a knuckle, a pivot element connecting the said knuckles, the knuckle of the swinging part being held in permanent frictional engagement with the resilient tongue, the last named knuckle having a flattened portion to engage with the resilient tongue when the swinging part is shifted to the upper inactive position, said tongue supporting the swinging part in the horizontal holding position.

In testimony whereof I affix my signature.

AMEL W. HOOKOM.